United States Patent
Gallifet et al.

(10) Patent No.: US 9,988,854 B2
(45) Date of Patent: Jun. 5, 2018

(54) ROLLER CONE DRILL BIT WITH IMPROVED EROSION RESISTANCE

(71) Applicant: Varel International Ind., L.P., Carrollton, TX (US)

(72) Inventors: Thomas Gallifet, Tomball, TX (US); Matthew Charles Stroever, Spring, TX (US)

(73) Assignee: VAREL INTERNATIONAL IND., L.P., Carrollton, TX (US)

(*) Notice: Subject to any disclaimer, the term of this patent is extended or adjusted under 35 U.S.C. 154(b) by 271 days.

(21) Appl. No.: 15/151,552

(22) Filed: May 11, 2016

(65) Prior Publication Data

US 2017/0328135 A1 Nov. 16, 2017

(51) Int. Cl.
*E21B 10/52* (2006.01)
*B23K 31/02* (2006.01)
*C23C 8/04* (2006.01)
*C23C 8/20* (2006.01)
*C23C 8/64* (2006.01)
*C23C 8/80* (2006.01)
*E21B 10/20* (2006.01)
*C23C 8/22* (2006.01)

(52) U.S. Cl.
CPC .............. *E21B 10/52* (2013.01); *B23K 31/02* (2013.01); *C23C 8/04* (2013.01); *C23C 8/20* (2013.01); *C23C 8/22* (2013.01); *C23C 8/64* (2013.01); *C23C 8/80* (2013.01); *E21B 10/20* (2013.01)

(58) Field of Classification Search
CPC .... C23C 8/04; C23C 8/20; C23C 8/64; C23C 8/80; C23C 8/22
See application file for complete search history.

(56) References Cited

U.S. PATENT DOCUMENTS

| | | |
|---|---|---|
| 1,480,418 A | 1/1924 | Pressell |
| 3,842,921 A | 10/1974 | Dill |
| 3,946,817 A | 3/1976 | Prince |
| 4,303,137 A | 12/1981 | Fischer |
| 4,660,444 A | 4/1987 | Sorensen |
| 4,708,752 A | 11/1987 | Kar |
| 4,756,373 A | 7/1988 | Kane |
| 4,907,665 A | 3/1990 | Kar |
| 5,975,223 A | 11/1999 | Karlsson |
| 6,159,306 A | 12/2000 | Barbour |
| 6,196,338 B1 | 3/2001 | Slaughter |
| 7,210,377 B2 | 5/2007 | Griffo |
| 8,307,920 B2 | 11/2012 | Buske |
| 2013/0248255 A1 | 9/2013 | Runquist |

OTHER PUBLICATIONS

European Search Report; dated Oct. 10, 2017; European Patent Application No. 17170319.2-1362.
Alias et al: "Mechanical Properties of 6 Paste Carburized ASTM A516 Steel", Procedia Engineering—International Tribology Conference Malaysia 2013, Nov. 18-20, 2013, Kota Kinabalu [MY], vol. 68, Nov. 18, 2013 (Nov. 18, 2013), pp. 525-530, XP028847525, Elsevier B. V. [NL] ISSN: 1877-7058, DOI: 10.1016/J. PROENG. 2013.12.216 *p. 526, paragraph 2*.

*Primary Examiner* — Jessee Roe

(57) ABSTRACT

A method of manufacturing a roller cone for a drill bit includes: selectively carburizing a land of the roller cone between a plurality of spots on the land for protection against erosion; after carburization, forming sockets in the roller cone at the spots; and mounting cermet inserts in the sockets.

17 Claims, 7 Drawing Sheets

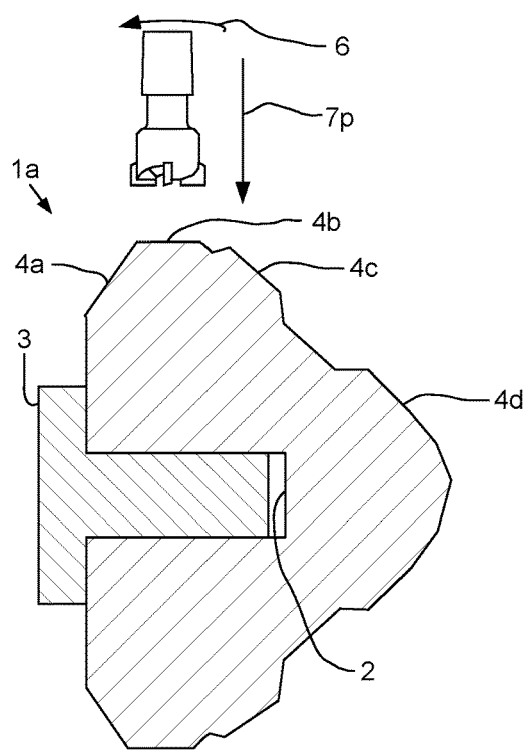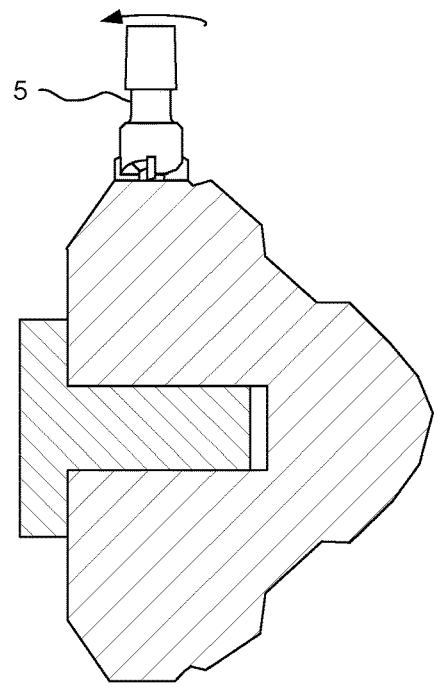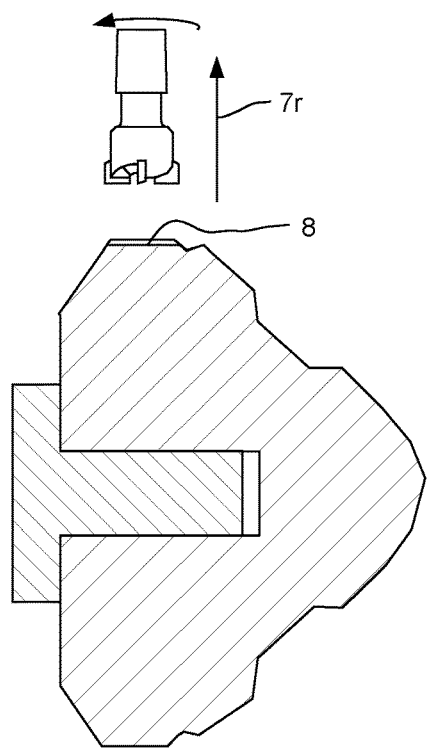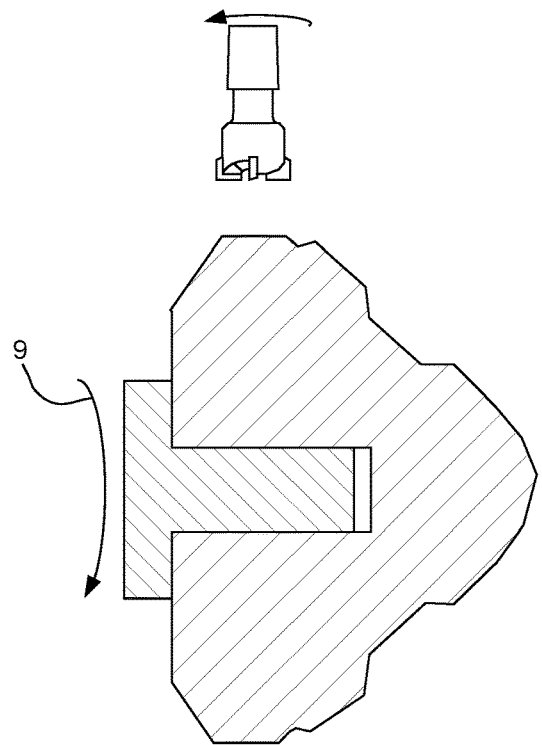
FIG. 1A  FIG. 1B
FIG. 1C  FIG. 1D

ROLLER CONE DRILL BIT WITH IMPROVED EROSION RESISTANCE

BACKGROUND OF THE DISCLOSURE

Field of the Disclosure

The present disclosure generally relates to a roller cone drill bit with improved erosion resistance.

Description of the Related Art

U.S. Pat. No. 4,303,137 discloses a method for manufacturing tungsten carbide insert-type cutter cones for a rock bit for drilling oil wells and the like. A cone blank is formed from medium to high carbon steel by forging and machining. The cone blank has a generally conical external surface, a generally cylindrical internal bearing cavity, and a circumferentially extending ball bearing race in the bearing cavity. The cone blank is heat treated by quenching and tempering to a desired core hardness. Insert holes are drilled in the external surface of the heat treated cone blank for insertion of tungsten carbide inserts. The surface of the ball race is selectively hardened by heating and quenching for forming a surface layer having a higher hardness than the core hardness. Selective hardening of the ball race is obtained by applying energy to the surface of the ball race by induction heating, an electron beam or a laser beam to austenitize a surface layer which is rapidly cooled for hardening.

U.S. Pat. No. 4,708,752 discloses that a medium to high carbon steel body of a roller cone for a drilling bit is machined to final dimensions, and is thereafter rendered absorbent to laser light by application of black paint or black etch. Holes for hard tungsten carbide or like inserts are drilled in the light absorbent steel body. The entire steel body, including the holes, is subjected to a laser treatment which, however, is effective to raise to above austenitizing temperature only the dark light absorbent surfaces. Walls of the insert holes, being shiny, reflect the laser light and are not effected by it. Rapid self-quenching of the laser heated surfaces results in a hard martensitic layer in the external surface, with a surface hardness of 57 to 60 Rockwell C units. The seal gland, heel, and spindle bore areas of the roller cones are hardened similarly by exposure to laser light. In an alternative process, the hard tungsten carbide or like inserts are press fitted into the holes before the laser treatment. The subsequent laser treatment does not affect the inserts adversely, because the inserts, too, have shiny light reflective surfaces, and therefore do not absorb the laser light.

U.S. Pat. No. 5,975,223 discloses a rock drill bit for rotary crushing machining of rock. The rock drill bit includes legs, each of which carry a journal provided with bearing surfaces cooperating via bearing elements with bearing races in a rotatable roller provided with inserts or chisels. Each leg is made from a parent material with substantially homogeneous hardness and each leg comprises a leg tail provided to resist entrance of drill cuttings into the bearings. The bearing surfaces have higher wear resistance than the parent material and the leg tail is at least partly of the same material condition as the bearing surfaces. The invention further relates to a method of manufacturing a rock drill bit.

U.S. Pat. No. 7,210,377 discloses a method of forming a drill bit structure, the method including fixing spacers to the drill bit structure. The spacers are arranged at preselected locations on an outer surface of the drill bit structure. A hardfacing material is then applied to the drill bit structure, and the spacers are removed. Holes are machined in the drill bit structure at the preselected locations, and drilling inserts are positioned in each hole. A method of forming a drill bit structure, the method including applying a hardfacing material to selected surfaces of the drill bit structure. The hardfacing material includes a perforated carbide infiltrated material and a perforated powder infiltrated material. The perforations in the powder infiltrated material correspond to the perforations in the carbide infiltrated material. Holes are machined in the drill bit structure at the locations of the perforations, and drilling inserts are positioned in each hole.

U.S. Pat. No. 8,307,920 discloses an earth boring drill bit that includes a cutting cone with a cutting disk. Compacts are inserted within the disk having a chisel shaped end set flush with the cutting disk periphery. The compact crests and cutting disk periphery form a generally seamless cutting surface. The cutting cone can further include cutting teeth thereon also having flush mounted compacts. The compacts can be made from a material such as cemented carbide, hardfacing, tungsten, tungsten alloys, tungsten carbide and the cutter made from steel.

SUMMARY OF THE DISCLOSURE

The present disclosure generally relates to a roller cone drill bit with improved erosion resistance. In one embodiment, a method of manufacturing a roller cone for a drill bit includes: selectively carburizing a land of the roller cone between a plurality of spots on the land for protection against erosion; after carburization, forming sockets in the roller cone at the spots; and mounting cermet inserts in the sockets.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 1A-1D illustrate spot facing of a first roller cone, according to one embodiment of the present disclosure.

DETAILED DESCRIPTION

Figure 2A:
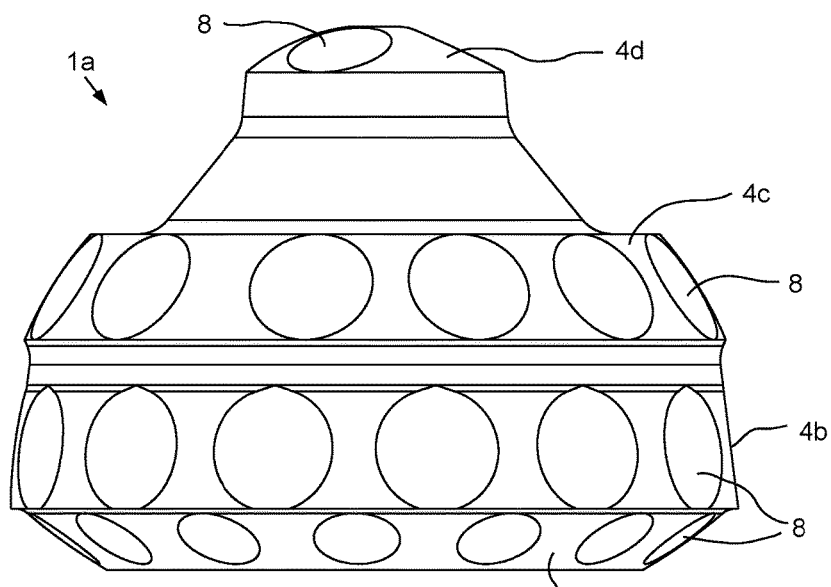
FIG. 2A illustrates the first roller cone having flats produced by the spot facing.

FIGS. 1A-1D illustrate spot facing of a first roller cone 1a, according to one embodiment of the present disclosure. The first roller cone 1a may start from a forged steel body of a conical shape. A handling socket 2 may be formed into a rear of the steel body for mounting thereof onto a spindle 3 of a machine tool, such as a lathe. The lathe may be manually operated or CNC. One or more lands, such as a heel land 4a, a gage land 4b, an inner land 4c, and a nose land 4d may be formed in an outer surface of the body, such as by turning, using the lathe.

Once the lands 4a-d have been formed, the spindle 3 may be locked and a spot facer 5 may be spun 6 and plunged 7p into an outer surface of one of the lands, such as the gage land 4b, until a flat 8 is formed. The spot facer 5 may be a counterbore bit (shown) or an end mill (not shown) and, if an end mill, may be articulated to form the flat 8 after plunging 7p. The spot facer 5 may be plunged 7p manually or be plunged and articulated by the CNC machine. Once the flat 8 has been formed, the spot facer 5 may be raised 7r and the spindle 3 may be unlocked and rotated 9 by a predetermined increment. Once rotated by the increment, the spindle 3 may be relocked and the spot facer 5 used to form a second flat. The spot facing process may be repeated until a set of flats has been formed around the selected land 4b.

Although implied that the spot facer 5 is in a vertical orientation, the spot facer may be in a horizontal orientation instead.

FIG. 2A illustrates the first roller cone 1a having flats 8 produced by the spot facing. Once the selected land 4b has been spot faced, the spot facing process may be repeated for the other lands 4a,c,d. Each flat 8 may be circular and may correspond to a location where an insert may later be mounted. Once the flats 8 have been formed, the handling socket 2 may be enlarged, such as by machining, to form a bearing shaft receptacle (not shown) for mounting the first roller cone 1a to a leg (not shown) of a drill bit.

Figure 2B:
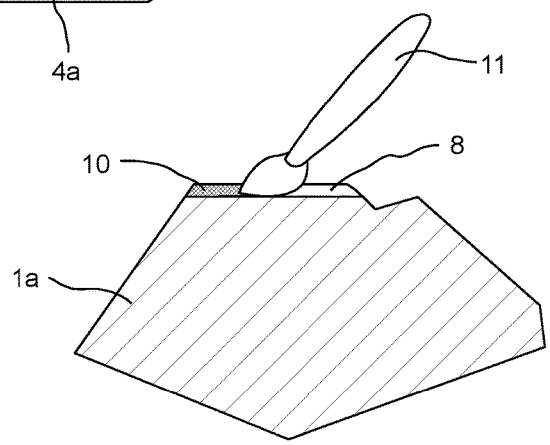
FIG. 2B illustrates applying inhibitor to one of the flats.

FIG. 2B illustrates applying inhibitor 10 to one of the flats 8. Once the bearing shaft receptacle has been formed, the inhibitor 10 may be applied to one of the flats 8 for protection of a region of the first roller cone 1a adjacent to the flat from carburization. The inhibitor 10 may be metallic paint or paste and may be applied using a brush 11. The inhibitor paint or paste may be formulated with a base metal having little or no affinity for carbon, such as copper. The inhibitor 10 may be applied manually or the application may be automated, such as by a robot.

Advantageously, for manual application of the inhibitor 10, the flats 8 provide a clear visual guide.

Alternatively, the inhibitor 10 may be applied using a sprayer, such as an airbrush (shown) or a spray gun (not shown). Alternatively, the spot facing may be omitted and the inhibitor 10 may be manually applied by covering the first roller cone 1a cone with a template (not shown) having holes formed therein to guide application of the inhibitor onto spots (corresponding to the flats 8 but without altering the outer surface of the first roller cone 1a) of the lands 4a-d thereof. Alternatively, the spot facing may be omitted and the inhibitor 10 may be applied by a robot (not shown) programmed to apply inhibitor onto spots (corresponding to the flats 8 but without altering the outer surface of the first roller cone 1a) of the lands 4a-d thereof.

Figure 2C:
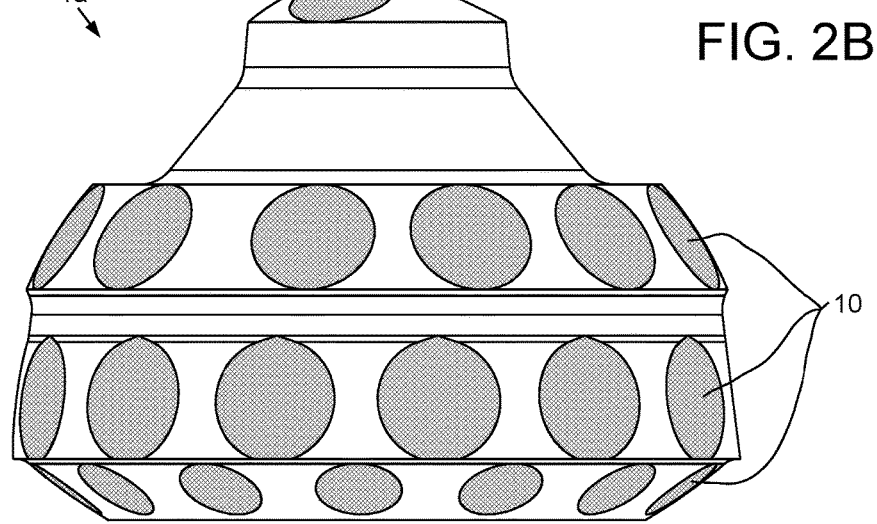
FIG. 2C illustrates the first roller cone having the inhibitor applied to the flats.

FIG. 2C illustrates the first roller cone 1a having the inhibitor 10 applied to the flats 8. The application of the inhibitor 10 may then be repeated for the rest of the flats 8 of the roller cone 1a.

Figure 3A:
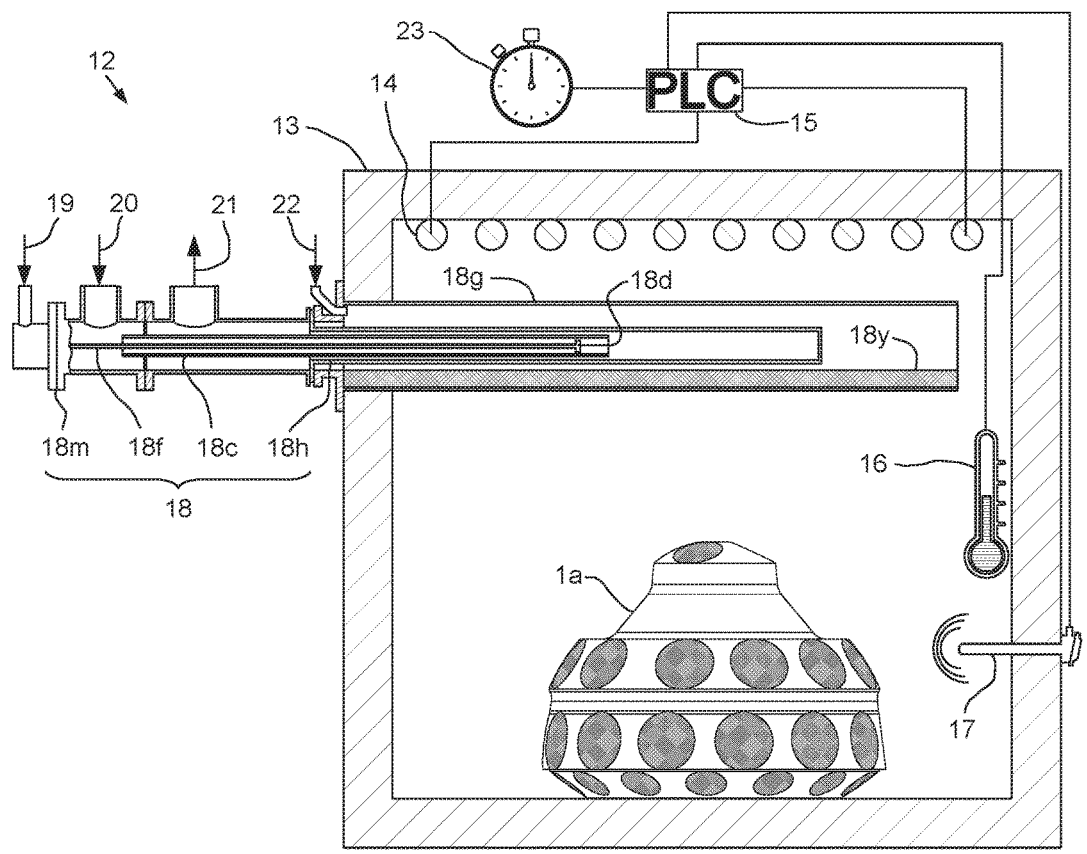
FIG. 3A illustrates carburizing of the first roller cone.

FIG. 3A illustrates carburizing of the first roller cone 1a. Once the inhibitor 10 has been applied to all of the flats 8 and has been allowed to cure, the first roller cone 1a may be loaded into a carburization furnace 12. The carburization furnace 12 may include a housing 13, a heating element 14, a controller, such as programmable logic controller (PLC) 15, a temperature sensor 16, a carbon potential sensor 17, a reactor 18, and a power supply (not shown).

The reactor 18 may be mounted to a sidewall of the housing 13 and extend through an opening therein. The reactor 18 may include a plurality of concentric tubes, such as a feed tube 18f, a combustion tube 18c, a heater tube 18h, and a generator tube 18g. The reactor 18 may further include a manifold 18m having a first inlet in fluid communication with the feed tube 18f for supplying fuel 19 thereto. The reactor 18 may further include a diffuser 18d connected to a distal end of the feed tube 18f and an igniter (not shown) disposed within the combustion tube 18c adjacent to the diffuser. The manifold 18m may further have a second inlet in fluid communication with the combustion tube 18c for supplying an oxidizer, such as air 20, thereto. The air 20 may flow down an annulus formed between the feed tube 18f and the combustion tube 18c to the diffuser 18d for mixing with the fuel 19. An end of the combustion tube 18c may be closed for diverting exhaust 21 resulting from combustion of the fuel 19 and air 20 up an annulus formed between the combustion tube 18c and the heater tube 18h to an outlet of the manifold 18m. The manifold 18m may also have a baffle isolating the outlet from the second inlet.

The manifold 18m may further have a third inlet in fluid communication with the generator tube 18g for supplying a mixture 22 of air and enriching gas thereto. The enriching gas may be a hydrocarbon or carbon-oxide. The mixture 22 may flow down an annulus formed between the generator tube 18g and the heater tube 18h for being heated by the counter-flowing exhaust 21 and/or radiation from the combustion. The reactor 18 may further include catalyst 18y packed along a portion of the annulus formed between the generator tube 18g and the heater tube 18h to promote cracking of the mixture 22. The catalyst 18y may be metallic, such as electrolytic nickel. The cracked mixture (not shown) may be discharged from the generator tube into a chamber formed in the housing 13 to establish a carburizing atmosphere therein.

Before loading of the first roller cone 1a, the furnace 12 may be preheated to a carburizing temperature and the reactor 18 operated to establish the carburizing atmosphere. The first roller cone 1a may be loaded and allowed to sit in the furnace for a predetermined period of time 23 sufficient for carburization of an uninhibited portion thereof. The inhibitor 10 may protect the flats 8 from carburization thereof.

Once carburization of the first roller cone 1a is complete, the first roller cone may be unloaded from the carburization furnace 12 and quenched. The first roller cone 1a may then be loaded into a heat treatment furnace (not shown) and tempered therein.

Alternatively, the reactor 18 may be omitted and the first roller cone 1a may instead be packed with carburizing material. Alternatively, the reactor 18 may be a separate unit from the furnace 12 and the cracked mixture may be piped thereto.

Figure 3B:
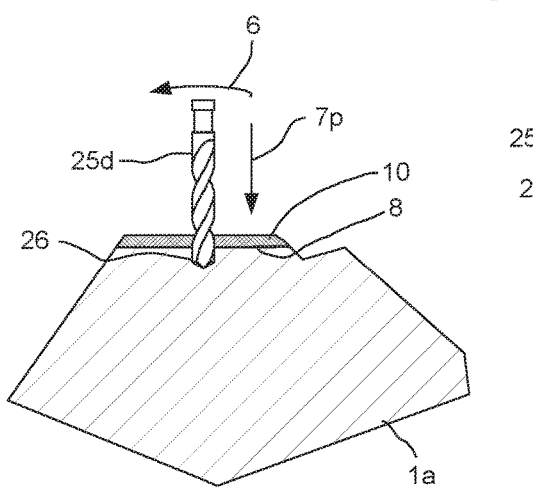
FIGS. 3B and 3C illustrate forming a socket at one of the flats.
Figure 3C:
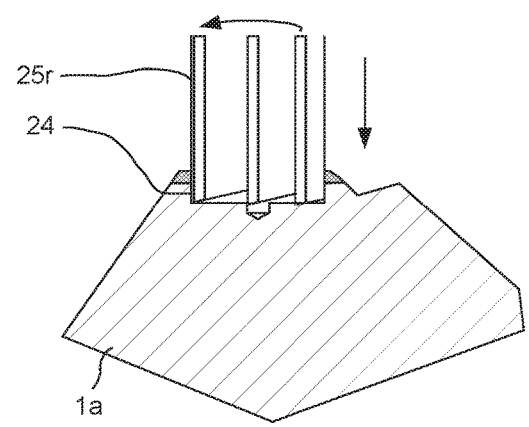

FIGS. 3B and 3C illustrate forming a socket 24 at one of the flats 8. Once the first roller cone 1a has been quenched and tempered, a drill bit 25d may be spun 6 and plunged 7p into the flat 8 to form a pilot hole 26 in the first roller cone 1a. Once the pilot hole 26 has been formed, a reamer 25r may be spun 6 and plunged 7p into the pilot hole 26 to form the socket 24 in the first roller cone 1a. Once the socket 24 has been formed into the flat 8, the drilling and reaming process may be repeated for the rest of the flats 8 to form the sockets 24 in the first roller cone 1a. Each flat 8 may be slightly oversized relative to the respective socket 24 to prevent leakage of carburization into the respective socket 24. A diameter of each flat 8 may be greater than a diameter of the respective socket 24, such as ten to sixty percent greater, to prevent the leakage. The oversizing may be limited such that the remainders of the lands 4a-d are still adequately protected from abrasion and/or erosion by the carburization.

Figure 4A:
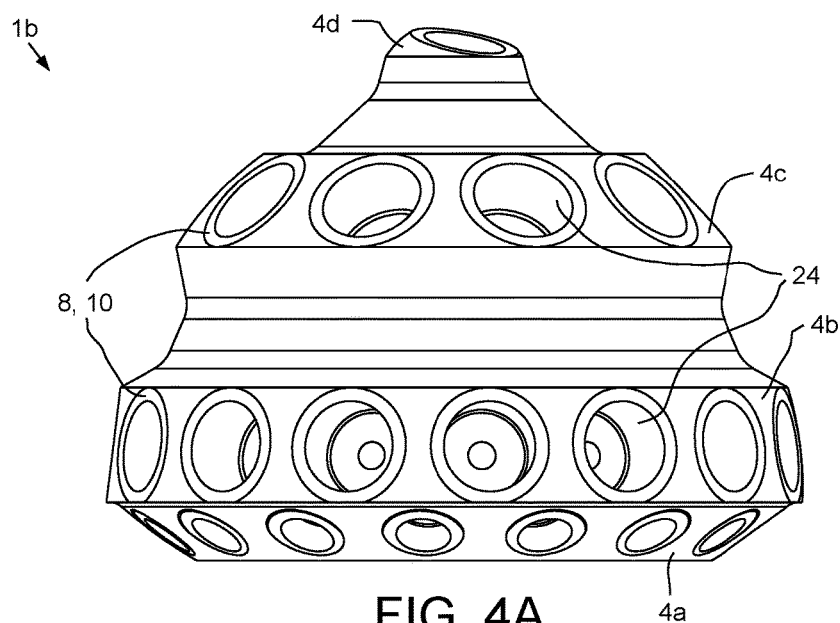
FIG. 4A illustrates a second roller cone having the sockets formed therein at the flats.

FIG. 4A illustrates a second roller 1b cone having the sockets 24 formed therein at the flats 8. As the spot facing, applying inhibitor 10, carburizing, and socket forming processes are being performed on the first roller cone 1a, the processes may be contemporaneously or immediately thereafter performed on second 1b and third 1c (FIG. 6) roller cones.

Figure 4B:
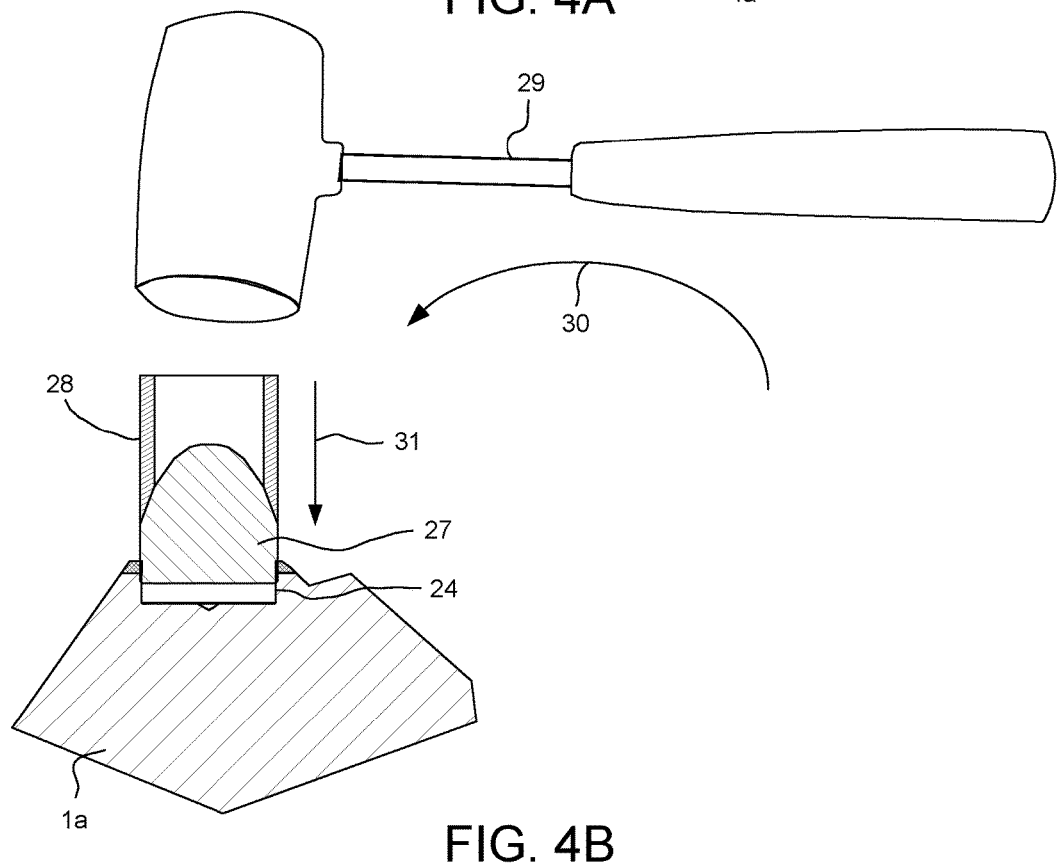
FIG. 4B illustrates pressing a cutter insert into one of the sockets.

FIG. 4B illustrates pressing a cutter insert 27 into one of the sockets 24. Each cutter insert 27 may be made from a cermet, such as a cemented carbide. The cemented carbide may be cobalt-tungsten carbide. Each cutter insert 27 may have a cylindrical base and a nose extending from the base. Each nose may be dome-shaped, conical, or chisel-shaped, such as each cutter insert 27 of the gage lands 4b having a chisel-shaped nose and each cutter insert of the inner 4c and nose 4d lands having a conical nose. Each base may have a diameter slightly greater than a diameter of the respective socket 24 to form an interference fit therebetween. To mount each cutter insert 27 into the respective socket 24, a sleeve 28 may be fit onto the nose of the respective cutter insert. The base of the respective cutter insert 27 may be aligned with the respective socket and a mallet 29 may be swung 30 to tap the sleeve 28, thereby pressing 31 the cutter insert 27 into the respective socket 24.

Alternatively, the base of each cutter insert 27 may have a diameter slightly less than a diameter of the respective socket 24 and the cutter insert may be mounted in the respective socket, such as by brazing, instead of interference fit.

Figure 5:
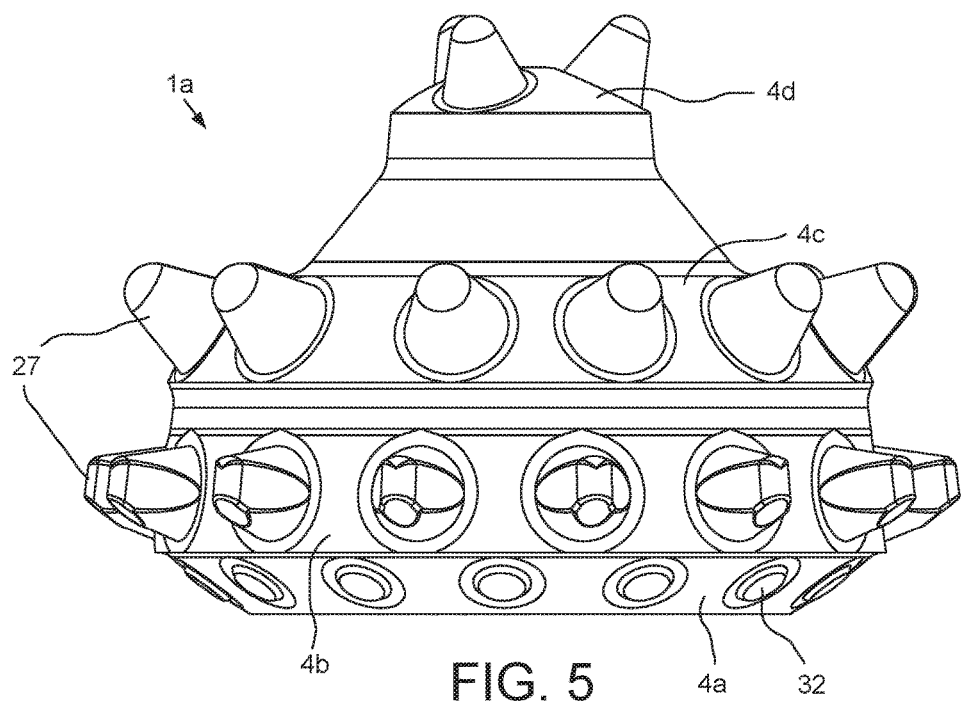
FIG. 5 illustrates the first roller cone having the cutter inserts pressed into the sockets.

FIG. 5 illustrates the first roller cone 1a having the cutter inserts 27 pressed into the sockets 24. Once the cutter insert 27 has been pressed into the respective socket 24, the pressing may be repeated for each of the remaining sockets 24 of the lands 4b-d. For the heel land 4a, stabilizer inserts 32 may be pressed into the respective sockets 24 thereof. Each stabilizer insert 32 may be made from a cermet, such as a cemented carbide. The cemented carbide may be cobalt-tungsten carbide. Each stabilizer insert 32 may be cylindrical and may have a diameter slightly greater than a diameter of the respective socket 24 to form an interference fit therebetween. Each stabilizer insert 32 may be pressed into the respective socket in a similar fashion to that of the cutter inserts 27, discussed above.

Alternatively, the base of each stabilizer insert 32 may have a diameter slightly less than a diameter of the respective socket 24 and the stabilizer insert may be mounted in the respective socket, such as by brazing, instead of interference fit.

Figure 6:
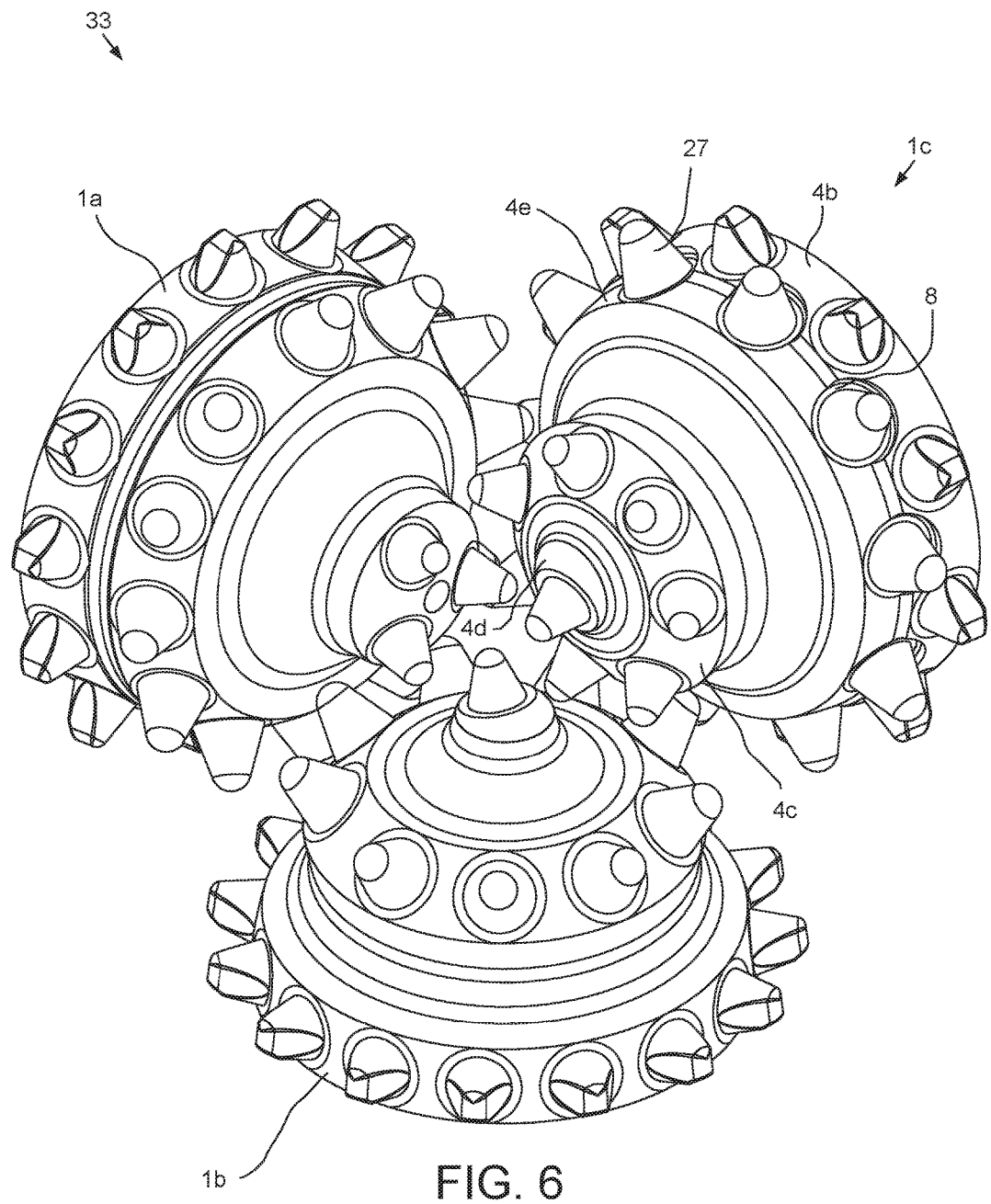
FIG. 6 illustrates a drill bit having the roller cones.

FIG. 6 illustrates a drill bit 33 having the roller cones 1a-c. The drill bit 33 may include a body (not shown) and the roller cones 1a-c. The nose lands 4d and the inner lands 4c of the roller cones 1a-c may be offset relative each other to form a continuous cutting profile. The third roller cone 1c may further have an outer land 4e formed adjacent to the gage land 4b thereof and in an outer surface thereof. The flats 8, sockets 24, and cutter inserts 27 of the outer land 4e may be oversized relative thereto, thereby overlapping with the gage land 4b thereof.

The body may have an upper shank and a lower leg for each roller cone 1a-c. The body may be made from a metal or alloy, such as steel. Each leg may be attached to the shank, such as by welding. The legs may be equally spaced around the body, such as three at one hundred twenty degrees. The shank may have a coupling, such as a threaded pin, formed at an upper end thereof for connection to another member of a bottomhole assembly of a drill string for drilling a wellbore. A bore may be formed in the shank and may extend from an upper end thereof to a plenum formed therein adjacent to a lower end thereof.

Each leg may have an upper shoulder, a mid shirttail, a lower bearing shaft, and a ported boss. The shoulder, shirttail, ported boss, and bearing shaft of each leg may be interconnected, such as by being integrally formed and/or welded together. Each ported boss may be in fluid communication with the plenum via a respective port formed in the shank and may have a nozzle fastened therein for discharging drilling fluid onto the respective roller cone 1a-c. Each bearing shaft may extend from the respective shirttail in a radially inclined direction. Each bearing shaft may have a journal for supporting rotation of the respective roller cone 1a-c therefrom. Each leg may have a lubricant reservoir formed therein and a lubricant passage extending from the reservoir to the respective journal bearing formed between the bearing shaft and the respective roller cone 1a-c. The lubricant may be retained within the each leg by a seal, such as an o-ring, positioned in a seal gland between the respective cone 1a-c and the bearing shaft. Each leg may also have a fill port in fluid communication with the lubricant reservoir and closed by a pressure compensator.

Each roller cone 1a-c may be mounted to the respective leg by a plurality of balls (not shown) received in a race formed by aligned grooves in each roller cone and the respective bearing shaft. The balls may be fed to each race by a ball passage formed in each leg and retained therein by a respective ball plug. Each ball plug may be attached to the respective leg, such as by welding. Upper and lower edges of each shirttail may be protected from erosion and/or abrasion by respective hardfacing with a ceramic or cermet material. An outer surface of each shirttail may also be protected from erosion and/or abrasion by stabilizer inserts secured into sockets thereof, such as by interference fit or brazing.

Alternatively, each cutter of the inner land 4c and/or nose land 4d of any one or all of the roller cones 1a-c may be a milled tooth hardfaced by a ceramic or cermet material instead of the cutter insert 27. Alternatively, the lubricant system may be omitted from the drill bit 33 and the drill bit may be used in a mining operation instead of a wellbore drilling operation.

Figure 7:
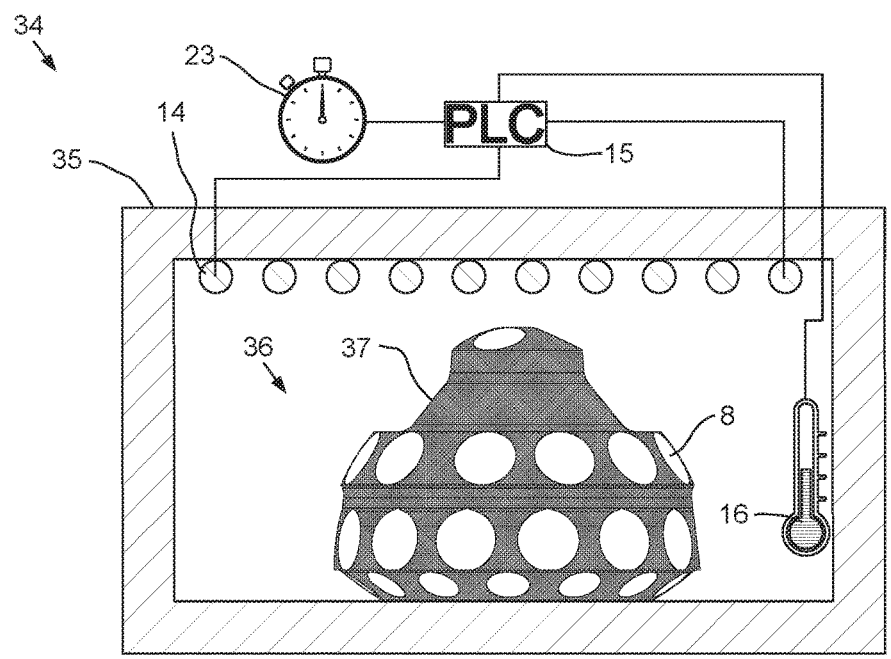
FIG. 7 illustrates carburization of a first roller cone, according to another embodiment of the present disclosure.

FIG. 7 illustrates carburization of a first roller cone 36, according to another embodiment of the present disclosure. Instead of using the inhibitor 10 to selectively carburize the first roller cone 1a, a promoter 37 may be applied to the first roller cone 36 at all surfaces thereof except for the flats 8. The first roller cone 36 may be otherwise identical to the first roller cone 1a. The promoter 37 may be a carbon-rich paint or paste and may be applied using the brush 11 or any alternatives therefor discussed above.

Once the promoter 37 has been applied and has been allowed to cure, the first roller cone 36 may be loaded into a furnace 34. The furnace 34 may include a housing 35, the heating element 14, the PLC 15, the temperature sensor 16, and the power supply (not shown). Before loading of the first roller cone 36, the furnace 34 may be preheated to a carburizing temperature. The first roller cone 36 may be loaded and allowed to sit in the furnace for the predetermined period of time 23 sufficient for carburization of the promoted portion thereof.

Once carburization of the first roller cone 36 is complete, the first roller cone may be unloaded from the furnace 34 and quenched. The first roller cone 36 may then be loaded into a heat treatment furnace (not shown) and tempered therein. Once heat treatment has been completed, the sockets may be formed into the first roller cone 36 at the flats 8 and the inserts may be pressed into the sockets as discussed above for the first roller cone 1a. The other two roller cones may be processed in a similar fashion and the three cones mounted to legs of a drill bit as discussed above.

Alternatively, the spot facing may be omitted and the promoter 37 may be manually applied by covering the first roller cone 1a cone with a template (not shown) to guide application of the promoter between spots (corresponding to the flats 8 but without altering the outer surface of the first roller cone 36) of the lands thereof and to the rest of the surfaces thereof. Alternatively, the spot facing may be omitted and the promoter 37 may be applied by a robot (not shown) programmed to apply inhibitor between spots (corresponding to the flats 8 but without altering the outer surface of the first roller cone 36) of the lands thereof and to the rest of the surfaces thereof.

While the foregoing is directed to embodiments of the present disclosure, other and further embodiments of the disclosure may be devised without departing from the basic scope thereof, and the scope of the invention is determined by the claims that follow.

The invention claimed is:

1. A method of manufacturing a roller cone for a drill bit, comprising:
   selectively carburizing a land of the roller cone between a plurality of spots on the land for protection against erosion;
   after carburization, forming sockets in the roller cone at the spots; and
   mounting cermet inserts in the sockets.

2. The method of claim 1, wherein the land is selectively carburized by:
   applying inhibitor to each spot; and
   carburizing the roller cone,
   wherein the inhibitor prevents carburization of the spots while the remainder of the land is carburized.

3. The method of claim 2, further comprising spot facing a plurality of flats in the land at the spots, wherein the inhibitor is applied to the flats.

4. The method of claim 2, wherein the inhibitor is a metallic paint or paste.

5. The method of claim 4, wherein the inhibitor is copper-based.

6. The method of claim 1, wherein the land is selectively carburized by:
   applying carbon-rich paint or paste to the land between the spots, and
   heating the roller cone.

7. The method of claim 1, wherein:
   the land is a gage land, and
   the inserts are cutter inserts.

8. The method of claim 7, wherein:
   an outer land of the roller cone is also selectively carburized, and
   the method further comprises repeating the socket forming and insert mounting for the outer land.

9. The method of claim 7, wherein:
   a heel land of the roller cone is also selectively carburized, and
   the method further comprises repeating the socket forming and insert mounting for the heel land.

10. The method of claim 9, wherein:
    inner and nose lands of the roller cone are also selectively carburized, and
    the method further comprises repeating the socket forming and insert mounting for the inner and nose lands.

11. The method of claim 1, wherein:
    the land is a heel land, and
    the inserts are stabilizer inserts.

12. The method of claim 1, wherein the spots are circular.

13. The method of claim 12, wherein the spots are slightly oversized relative to the sockets to prevent leakage of the carburization therein.

14. The method of claim 13, wherein a diameter of each spot is ten to sixty percent greater than a diameter of the respective socket.

15. The method of claim 1, wherein the inserts are mounted in the sockets by press fitting.

16. The method of claim 1, wherein the sockets are each formed by drilling a pilot hole and then reaming the pilot hole into the respective socket.

17. A drill bit, comprising:
    a body having a shank for connection to a drill string and a plurality of legs attached to the shank; and
    a plurality of roller cones, each roller cone mounted to a respective leg and manufactured according to the method of claim 1.

* * * * *